United States Patent [19]

Hammond et al.

[11] 4,051,062

[45] Sept. 27, 1977

[54] 7-AMINO COUMARIN DYES FOR FLASHLAMP-PUMPED DYE LASERS

[75] Inventors: Peter R. Hammond, Livermore; Erhard J. Schimitschek, San Diego; John A. Trias, La Mesa, all of Calif.

[73] Assignee: The United States of America as represented by the Secretary of the Navy, Washington, D.C.

[21] Appl. No.: 720,175

[22] Filed: Sept. 3, 1976

[51] Int. Cl.$^2$ ............................ H01S 3/20; F21K 2/00
[52] U.S. Cl. ............................ 252/301.17; 331/94.5 L
[58] Field of Search .............. 252/301.17; 331/94.5 R, 331/94.5 L

[56] References Cited

U.S. PATENT DOCUMENTS

| | | | |
|---|---|---|---|
| 3,521,187 | 7/1970 | Snavely et al. | 331/94.5 |
| 3,684,979 | 8/1972 | Myer et al. | 331/94.5 L |
| 3,891,569 | 6/1975 | Schimitschek et al. | 252/301.17 |
| 3,906,399 | 9/1975 | Dienes et al. | 331/94.5 L |

FOREIGN PATENT DOCUMENTS

| | | | |
|---|---|---|---|
| 2,310,748 | 9/1974 | Germany | 331/94.5 L |

OTHER PUBLICATIONS

Schimitschek et al., Optics Communications, vol. 15, No. 3, pp. 313-316, Mar. 1975.
Winters et al., Appl. Phys. Lett., vol. 25, pp. 723, 724, Dec. 1974.

Primary Examiner—F.C. Edmundson
Attorney, Agent, or Firm—R. S. Sciascia; Roy Miller; David J. Aston

[57] ABSTRACT

7-Amino coumarin dyes with hydrocarbon substituents on the amino group, but otherwise unsubstituted are stable, efficient dyes which lase in the blue-green region in a flashlamp-pumped dye laser.

4 Claims, No Drawings

7-AMINO COUMARIN DYES FOR FLASHLAMP-PUMPED DYE LASERS

BACKGROUND OF THE INVENTION

This invention relates to lasers and more particularly to organic dye lasers and to the use of certain nitrogen-containing dyes capable of lasing when properly excited.

Apart from their previous use as laundry brighteners, coumarin derivatives 161.5°; been the subject of a considerable amount of research because of their usefulness as lasing dyes. Snavely, for instance reports in U.S. Pat. No. 3,521,187 that, generally, any fluorescent coumarin dye which is soluble in water may be used as a laser dye. Drexhage in U.S. Pat. No. 3,873,940 discloses a vast array of coumarin derivatives with a fused rigidized nitrogen containing ring which can be useful as laser dyes. Drexhage emphasizes the necessity that the nitrogen be part of a heterocyclic ring which is joined to the main ring at at least two points. Drexhage and Reynolds reported in *Optics Communications* Vol. 13, p. 222 (March 1975) that they and others have found that coumarin derivatives with an amino group in the 7 position are very efficient laser dyes in the blue and green regions of the spectrum. The inventors also have done previous work with 7-amino coumarin, as reported in *Optics Communications*, Vol. 11, p. 352 (1974).

The numbered positions of the coumarin ring structure are as follows:

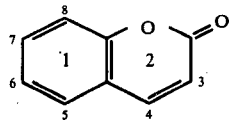

7-Amino coumarin laser dyes previously described have had other substituents on the ring structure, typically in the 4 position.

4-Methyl-7-diethyl-amino coumarin was attractive for use as a laser dye because it is commercially available and it lases in the blue-green range of the spectrum, which is important in underwater laser systems. This and similar compounds, however, have unsatisfactory photochemical stability. 4-Trifluoromethyl coumarins were found to be more stable, but they lase 40 to 50nm more to the red than the unfluorinated dye.

7-Amino coumarins are thought to photodimerise across positions 3 and 4, and workers in the field have previously added electron accepting or bulky substituents at these positions to increase the dyes' stability.

SUMMARY OF THE INVENTION

A 7-amino coumarin unsubstituted in the 4 position has improved photochemical stability but lases well in the blue-green region. The amino group may carry methyl or ethyl groups, or may be part of a heterocyclic ring. 7-Diethyl amino coumarin and 7-dimethyl amino coumarin are especially efficient and stable.

This type of compound will lase easily when properly excited. Its untuned lasing wavelength is shorter than most amino coumarins, and centers about the peak transmission window of seawater, 480mn. Ethanol is a preferred solvent for the dye of the present invention.

DESCRIPTION OF THE PREFERRED EMBODIMENT

Laser Tests

Laser output power and photochemical stability of the dye solutions were determined by exposing a fixed stationary dye volume of about 0.2ml to repetitive flashlamp pulses in a laser head. The solutions were contained in a bore 5cm × 2mm heavy wall capillary quartz cell with spherical mirrors in direct contact with the liquid. Both mirror surfaces had a radius of curvature of 12.5cm and reflectivities of 99% and 90%, respectively. The light from the flashlamp passed through an Amersil type germicidal quartz jacket with a short wave-length cut-off point at 220nm. The elliptical pump light reflector consisted of an optically polished, externally aluminized quartz sleeve, which provided improved optical coupling. The coupling was further enhanced by filling the inside of the laser head completely with water.

The laser output of each dye solution for a 5J electrical input into the flashlamp was monitored with a calibrated diode as a function of the number of successive shots. The repetition rate was .5Hz to avoid any any appreciable heating of the stationary dye solution. The number of shots obtainable from a dye solution to the 50% decline point of the initial output was taken as a relative measure of the stability under flashlamp excitation and is shown in the chart below.

All solutions were prepared at $7.5 \times 10^{-4}M$ concentration in air-saturated, absolute ethanol. Oxygen in the solution increased slope efficiency and lowered the threshold of the dyes.

The Dyes

The following compounds are illustrative of the present invention:

| | Dye | Wavelength untuned (nm) | Intial peak output power (kw) | Relative no. of laser shots 50% decline of initial output |
|---|---|---|---|---|
| 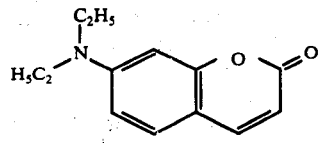 | C1H | 466 | 8.0 | 480 |

| Dye | Wavelength untuned (nm) | Initial peak output power (kw) | Relative no. of laser shots 50% decline of initial output |
| --- | --- | --- | --- |
| [structure: 7-methylamino-coumarin with CH₃ and H on N] C2H | 465 | 7.5 | 365 |
| [structure: 7-amino-coumarin with H, H on N] C3H | 450 | 1.0 | 10 |
| [structure: tetrahydroquinoline-fused coumarin with NH] C4H | 477 | 5.0 | 30 |
| [structure: julolidine-type coumarin] C6H | 490 | 7.0 | 255 |
| [structure: N-methyl tetrahydroquinoline-fused coumarin] C8H | 475 | 7.0 | 255 |

The designations in the "Dye" column are arbitrary shorthand designations for the respective dyes. "Wavelength" on the chart above indicates the peak of the laser output spectrum. Initial peak output power is measured from the first shot and thereafter declines as indicated in the last column.

The following examples are illustrative of the synthesis of compounds of the present invention:

7-Dimethylamino-Coumarin m-Dimethylaminophenol 6.0g, malic acid 6.0g and 85% sulfuric acid 12.0ml were heated in an oil bath at 120° for an hour. The mixture was cooled, diluted with crushed ice 50g, filtered, made alkaline with sodium carbonate and extracted with chloroform, which was separated, washed and dried over sodium sulfate. Evaporation of the chloroform produced a deep red gum which could not be induced to crystallize. The material was separated down an alumina column using dichloromethane, and the strong blue fluorescent ring was cut out, eluted with methanol and evaporated to dryness. Crystallization from i-propanol gave light brown needles, which on resrystallization became light yellow and lustrous, 0.65g (8%), m.p. 161°–161.5found C 69.95, 69.80; H 5.74, 5.79; N 7.36, 7.37; $C_{11}H_{11}NO_2$ requires C 69.8; H 5.82; N 7.41%. The nuclear magnetic resonance spectrum (A-60) in deuterochloroform showed the methyl singlet 3.02 and the aromatic protons as follows: $H_4$ and $H_3$ centered at 6.00 and 7.54 respectively split by 9 cycles to give an AB quartet, $H_8$ singlet at 6.47, $H_6$ and $H_5$ centered at 6.51 and 7.27 respectively split by 9 cycles to give another AB quartet and the $H_6$ was further split by interaction with $H_8$. Integrated intensities were in accord with the proposed structure.

7-Diethylamino-Coumarin m-Diethylaminophenol 7.4g, malic acid 6.0g and 85% sulfuric acid 12.0ml were treated as for the 7-dimethylamino-coumarin, although the alumina column cut could not be induced to crystallize. It was rechromatographed, eluting first with benzene thoroughly, and then developing with dichloromethane. After two crystallizations from cyclohexane, cream colored crystals 0.5g (5%), m.p. 87.5°–88.0° were obtained, found C 71.94; H 7.09; N 6.35; $C_{13}H_{15}NO_2$ requires C 7.19; H 6.92; N 6.45%.

The compounds containing fused, rigidized nitrogen-containing rings may be prepared by substituting an aminophenol precursor in the modified Pechmann reactions illustrated above. Details of obtaining these precursors may be found in *J. Amer. Chem. Soc.*, Vol 86, p. 2533.

What is claimed is:

1. A laser dye solution comprising a compound of the type

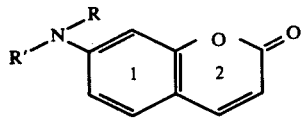

wherein R and R' are the same or different, being selected from the group consisting of hydrogen, methyl, ethyl, and a 3 carbon chain fused to ring 1 to form a heterocyclic ring.

2. The compound of claim 1 wherein R and R' are methyl groups.

3. The compound of claim 1 wherein R and R' are ethyl groups.

4. The solution of claim 1 comprising an air-saturated absolute ethanol solvent.

* * * * *